United States Patent [19]

Kanno et al.

[11] Patent Number: 5,149,770
[45] Date of Patent: Sep. 22, 1992

[54] PREPARATION OF A POLYCARBONATE WITH ELECTRON DONATIVE AMINE COMPOUND AND ALKALI OR ALKALINE EARTH METAL COMPOUND

[75] Inventors: Tatsuya Kanno; Tsutomu Yamato, both of Himeji, Japan

[73] Assignee: Daicel Chemical Industries, Ltd., Osaka, Japan

[21] Appl. No.: 764,300

[22] Filed: Sep. 24, 1991

Related U.S. Application Data

[63] Continuation-in-part of Ser. No. 638,975, Jan. 8, 1991, which is a continuation-in-part of Ser. No. 475,206, Feb. 2, 1990, Pat. No. 5,025,083, which is a continuation-in-part of Ser. No. 423,336, Oct. 18, 1989, abandoned.

[30] Foreign Application Priority Data

Feb. 10, 1989 [JP] Japan .................................. 1-31904
Jun. 23, 1989 [JP] Japan .................................. 1-161039
Oct. 26, 1989 [JP] Japan .................................. 1-279048

[51] Int. Cl.$^5$ ...................... C08G 64/28; C08G 64/30
[52] U.S. Cl. ..................................... 528/199; 528/196; 528/202; 528/204
[58] Field of Search ................. 528/199, 196, 202, 204

[56] References Cited

U.S. PATENT DOCUMENTS 5,025,083  6/1991  Ueda et al. ........................... 528/199

Primary Examiner—Harold D. Anderson
Attorney, Agent, or Firm—Flynn, Thiel, Boutell & Tanis

[57] ABSTRACT

A polycarbonate is produced by melt-polycondensing a dihydric hydroxy compound and a bisarylcarbonate in the presence of a catalyst system comprising an electron donative amine compound and a compound selected from among alkali metal compounds and alkaline earth metal compounds. The process of the invention eliminates the use of poisonous phosgene, prevents chloride ions from being incorporated into the product polycarbonate and remains in the reaction system longer to enable the preparation of high-molecular weight polycarbonates.

7 Claims, No Drawings

PREPARATION OF A POLYCARBONATE WITH ELECTRON DONATIVE AMINE COMPOUND AND ALKALI OR ALKALINE EARTH METAL COMPOUND

This application is a continuation-in-part of U.S. application Ser. No. 07/638 975, filed Jan. 8, 1991, which is a continuation-in-part of U.S. patent application Ser. No. 07/475 206, filed Feb. 2, 1990, now U.S. Pat. No. 5,025,083, which is a continuation-in-part of U.S. patent application Ser. No. 07/423 336, filed Oct. 18, 1989, now abandoned.

The present invention relates to a process for preparing a high-molecular weight polycarbonate by melt-condensing a dihydric hydroxy compound and a bisaryl carbonate in the presence of a catalyst.

The high-molecular polycarbonate of the present invention is a general purpose engineering thermoplastic which can be used in wide applications, particularly in injection molding or as a glass sheet instead of a window glass.

Interfacial polycondensation is generally effective in producing a polycarbonate, but has drawbacks in that toxic phosgene is generally utilized in the reaction and chloride ions remain in the formed polycarbonate.

In order to eliminate these drawbacks, Japanese Patent Laid-Open No. 182336/1988 discloses production of a polycarbonate through interfacial polycondensation of a particular dihydric alcohol with liquid trichloromethyl chloroformate instead of toxic phosgene. However, only 9,9-bis(4-hydroxyphenyl)fluorene is described as the particular dihydric phenol. Angew. Chem., 99,922 (1987) describes that a polycarbonate is prepared from 2,2-bis(4-hydroxyphenyl)propane by making use of triphosgene instead of toxic phosgene. However, it also describes a reaction mechanism by which phosgene is generated.

EP-A-0382250 discloses a process for producing a polycarbonate by melt-polycondensing a dihydric hydroxy compound and a bisarylcarbonate in the presence of a catalyst selected from electron-donating amine compounds and salts thereof. As catalysts N-N-dimethyl-4-aminopyridine, 4-diethylaminopyridine, 4-pyrrolidinopyridine, 4-(5-quinolyl)-pyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, 2-aminopyridine, aminoquinoline, imidazole, 2-methylimidazole, 4-methylimidazole and diazabicyclooctane (DABCO) are disclosed.

In Japanese Laid-open Patent Application No. 60-51719, there has been proposed a process of preparing polycarbonates in which polycarbonates are prepared by the use of a catalyst which is made of a combination of a nitrogen-containing basic compound and a boron compound. The use of the catalyst results in relatively light-colored polycarbonates, with an attendant problem that the catalyst has low polymerization activity.

Further, Japanese Laid-open Patent Application No. 2-124934 discloses preparation of polycarbonates by melt polycondensation of aromatic organic dihydric compounds and carbonic acid diesters by use of a catalyst composed of a nitrogen-containing basic compound and an alkali metal compound or alkaline earth metal compound. However, as the nitrogen-containing basic compound, only basic salts such as tetraalkylammonium hydroxides, ammonium hydroxides containing alkyl, aryl, araryl or the like group, tertiary amines, secondary amines, primary amines, tetraalkyl borohalides, tetraalkylammonium tetraarylborates and the like are mentioned.

These catalysts are, however, distilled off in a larger amount together with phenol and provide a product with a low number-average molecular weight.

It is therefore the object of the present invention to provide a process for producing a polycarbonate wherein the amount of catalyst distilled off is decreased and wherein a product with a high number-average molecular weight is obtained.

Said object is achieved by a process for producing a polycarbonate by melt-polycondensing a dihydric hydroxy compound and a bisarylcarbonate in the presence of a catalyst system comprising an electron donative amine compound and a compound selected from among alkali metal compounds and alkaline earth metal compounds.

According to the process of the present invention it is possible to produce, without resorting to toxic phosgene, a high-molecular weight colorless transparent polycarbonate which is substantially free of chlorine ions.

Preferably, the dihydric hydroxy compound is selected from dihydric phenols represented by any of the following formulae (I), (II), (III) and (IV):

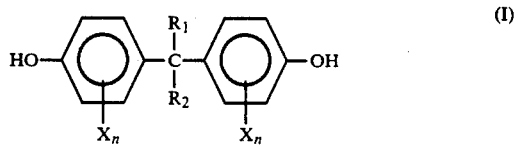

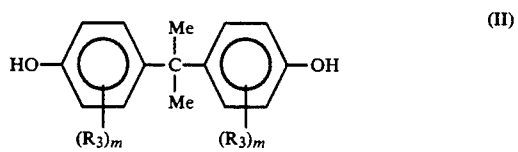

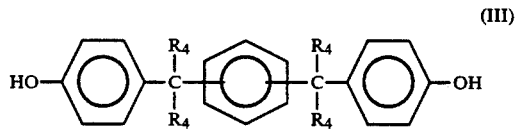

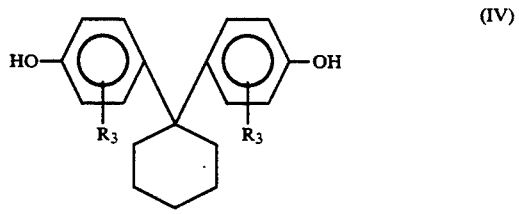

wherein $R_1$, $R_2$, $R_3$ and $R_4$ are each hydrogen, a straight chain or branched alkyl group having 1 to 8 carbon atoms, or a phenyl group, X is a halogen atom, n is 0 to 4, and m is 1 to 4.

Typical examples of the electron donative amine compounds usable in the present invention include N,N-dimethyl-4-aminopyridine, 4-diethylaminopyridine, 4-pyrrolidinopyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, 2- aminopyridine, aminoquinoline, benzimidazole, imidazole, 2-methylimidazole, 4-methylimidazole, diazabicyclooctane (DABCO), 1,8-diazabicyclo[5,4,0]-7-undecene (DBU) and the like.

Typical examples of the alkali metal compound include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, potassium borohydride, sodium phenylboronate, sodium benzoate, potassium benzoate, lithium benzoate, disodium hydrogenphosphate, dipotassium hydrogenphosphate, dilithium hydrogenphosphate, disodium salt, dipotassium salt and dilithium salt of bisphenol A, sodium salt, potassium salt and lithium salt of phenol, and the like.

Typical examples of the alkaline earth metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium acetate, magnesium acetate, strontium acetate, calcium stearate, barium stearate, magnesium stearate, strontium stearate and the like.

Representative examples of the dihydric phenol include the following compounds. Examples of the bisphenol represented by the general formula (I) include 2,2-bis-(4-hydroxyphenyl)propane, 2,2-bis-(4-hydroxyphenyl)butane, 2,2-bis-(4-hydroxyphenyl)-4-methylpentane, 2,2-bis-(4-hydroxyphenyl)octane, 4,4'-dihydroxy-2,2,2-triphenylethane, and 2,2-bis-(3,5-dibromo-4-hydroxyphenyl)propane. Examples of the bisphenol represented by the general formula (II) include 2,2-bis-(4-hydroxy-3-methylphenyl)propane, 2,2-bis-(4-hydroxy-3-isopropylphenyl)propane, 2,2-bis-(4-hydroxy-3-sec-butylphenyl)propane, 2,2-bis-(3,5-dimethyl-4-hydroxyphenyl)propane, and 2,2-bis-(4-hydroxy-3-tertbutylphenyl)propane. Examples of the bisphenol represented by the general formula (III) include 1,1'-bis-(4-hydroxyphenyl)-p-diisopropylbenzene, and 1,1'-bis-(4-hydroxyphenyl)-m-diisopropylbenzene. Examples of the bisphenol represented by the general formula (IV) include 1,1-bis(4-hydroxyphenyl)cyclohexane.

Further, it is also possible to prepare a polycarbonate copolymer through a combination of at least two dihydric hydroxy compounds, e.g., a combination of phenols selected from those represented by the general formulae (I), (II), (III) and (IV).

The method according to the present invention can be practiced by melt-polycondensing a dihydric hydroxy compound, such as bisphenol A, with a bisaryl carbonate, such as bisphenyl carbonate, in the presence of the catalyst system comprising an electron donative amine compound and a compound selected from among alkali metal compounds and alkaline earth metal compounds.

This reaction is generally conducted at a temperature in the range of 100° to 300° C., preferably at 130° to 280° C. When the temperature is below 130° C., the reaction rate is reduced, while when the temperature exceeds 300° C., side reactions tend to occur.

The electron donative amine compound is generally used in an amount of $10^{-1}$ to $10^{-5}$ mol, preferable $10^{-2}$ to $10^{-4}$ mol based on 1 mol of the dihydric hydroxy compound present in the reaction system. When the amount is less than $10^{-5}$ mol, the rate of polymerization of polycarbonate is reduced because of poor catalytic action. On the other hand, when the amount is more than $10^{-1}$ mol, the proportion of the catalyst remaining in the resultant polycarbonate is increased, which brings about a lowering in the properties of the polycarbonate.

The amount of the alkali metal compound or alkaline earth metal compound used in the catalyst system should be from $10^{-2}$ mol to $10^{-6}$ mol, preferably from $10^{-3}$ mol to $10^{-5}$ mol per the dihydric phenol present in the reaction system.

If the amount is less than $10^{-5}$ mol, the catalytic activity is so small that the degree of polymerization of the resultant polycarbonate does not reach a desired level. Over $10^{-2}$ mol, the amount of the catalyst remaining in the polycarbonate becomes high, which results in the lowering of the physical properties of the polycarbonate.

The bisaryl carbonate should be used in an equimolar amount to the dihydric hydroxy compound. In general, in order to form a high-molecular polycarbonate, 1 mol of a carbonate compound should be reacted with 1 mol of a dihydric hydroxy compound.

When bisphenyl carbonate is used, 2 mols of phenol is formed by the above-described reaction. The 2 mols of phenol thus formed are distilled away out of the reaction system.

The present invention will now be described by way of examples.

EXAMPLE 1

22.8 g (0.1 mol) of 2,2-bis (4-hydroxyphenyl)propane was mixed with 0.164 g ($2 \times 10^{-2}$ mols) of 2-methylimidazole, 0.0082 g ($1 \times 10^{-4}$ mol) of potassium acetate and 21.4 g (0.1 mol) of bisphenyl carbonate, and the mixture was stirred at 180 C for 1 hour in a nitrogen atmosphere. The temperature of the system was raised while gradually evacuating the system. Finally, polycondensation was conducted at 250° C. and 0.1 Torr for 1 hour and the formed phenol was distilled away to prepare a clear polycarbonate. The viscosity-average molecular weight ($\overline{M}v$) was determined to be 27,600.

The viscosity-average molecular weight was determined by measuring the intrinsic viscosity [$\eta$] of the polymer in the form of a methylene chloride solution at 20° C. with an Ubbelohde's viscometer and calculating the viscosity-average molecular weight ($\overline{M}v$) according to the following equation:

$$[\eta] = 1.11 \times 10^{-4}(\overline{M}v)^{0.82}$$

EXAMPLE 2

0.0122 g ($1 \times 10^{-4}$ mol) of 4-dimethylaminopyridine was added in place of 2-methylimidazole and 0.01 g ($1 \times 10^{-4}$ mol) of calcium carbonate was further added in the reaction system of Example 1 and the reaction was conducted under the same conditions as in Example 1. The mixture was stirred for 2 hours in a nitrogen atmosphere, and polycondensation was conducted in the same manner as in Example 1 to prepare a clear polycarbonate. The viscosity-average molecular weight ($\overline{M}v$) was determined to be 27,000. The glass transition temperature was 150° C.

EXAMPLE 3

11.4 g (50 % by mol) of 2,2-bis(4-hydroxyphenyl)-propane, 17.0 g (50 % by mol) of 3,3-bis(4-hydroxy-3-tertbutylphenyl)propane, and 0.0122 g ($1 \times 10^{-4}$ mol) of 4-dimethylaminopyridine and 0.00066 g ($1 \times 10^{-5}$ mol) of lithium acetate were stirred for 24 hours in a nitrogen atmosphere, and polycondensation was conducted in the same manner as in Example 1 to prepare a clear polycarbonate carbonate. The viscosity-average molecular weight ($\overline{M}v$) was determined to be 24,500 and the glass transition temperature was 128° C.

COMPARATIVE EXAMPLE

The same treatment as in Example 1 was conducted by using pyridine instead of 4-dimethylaminopyridine and 0.00066 g ($1 \times 10^{-5}$ mol) of lithium acetate was further added under the same reaction conditions as in Example 1. However, the viscosity-average molecular weight ($\overline{M}v$) of the resultant polycarbonate was 6,000, which is unsuitable for practical use although it was in the form of polycarbonate.

What is claimed is:

1. A process for producing a polycarbonate by melt-polycondensing, at least one dihydric hydroxy compound and a bisarylcarbonate in the presence of a catalyst system comprising an electron donative amine compound and a compound selected from the group consisting of alkali metal compounds and alkaline earth metal compounds.

2. The process of claim 1, in which the dihydric hydroxy compound is selected from dihydric phenols represented by any of the following formulas (I), (II), (III) and (IV):

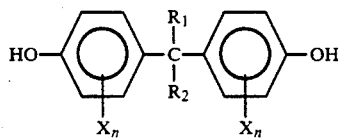
(I)

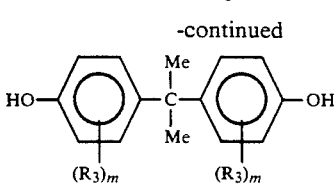
(II)

(III)

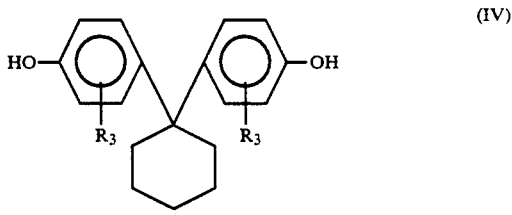
(IV)

wherein $R_1$, $R_2$, $R_3$ and $R_4$ each represents hydrogen, a straight chain or branched alkyl group having 1-8 carbon atoms, or a phenyl group; X represents a halogen atom; n is 0-4 and m is 1-4.

3. The process of claim 1, in which the electron donative amine compound is present in an amount of $10^{-1}$ to $10^{-5}$ mol per 1 mol of the dihydric hydroxy compound.

4. The process of claim 1, in which the electron donative amine compound is present in an amount of $10^{-2}$ to $10^{-4}$ mol per 1 mol of the dihydric hydroxy compound.

5. The process of claim 1, in which the compound selected from the group consisting of alkali metal compounds and alkaline earth metal compounds is present in an amount of $10^{-2}$ to $10^{-6}$ mol per 1 mol of the dihydric hydroxy compound.

6. The process of claim 1, in which the compound selected from the group consisting of alkali metal compounds and alkaline earth metal compounds is present in an amount of $10^{-3}$ to $10^{-5}$ mol per 1 mol of the dihydric hydroxy compound.

7. The process of claim 1, comprising melt polycondensing two or more dihydric hydroxy compounds.

* * * * *

UNITED STATES PATENT AND TRADEMARK OFFICE
CERTIFICATE OF CORRECTION

PATENT NO. : 5 149 770

DATED : September 22, 1992

INVENTOR(S) : Tatsuya KANNO et al

It is certified that error appears in the above-identified patent and that said Letters Patent is hereby corrected as shown below:

Column 5, line 27; change "polycondensing," to ---polycondensing---.

Signed and Sealed this

Twenty-eighth Day of December, 1993

Attest:

BRUCE LEHMAN

Attesting Officer

Commissioner of Patents and Trademarks